(12) United States Patent
Rai

(10) Patent No.: US 6,604,947 B1
(45) Date of Patent: Aug. 12, 2003

(54) ALPHABET IMAGE READING METHOD

(76) Inventor: Shogen Rai, 5-36-41-303, Shimomeguro, Meguro-ku, Tokyo 153-0064 (JP)

( * ) Notice: Subject to any disclaimer, the term of this patent is extended or adjusted under 35 U.S.C. 154(b) by 0 days.

(21) Appl. No.: 09/598,380

(22) Filed: Jun. 21, 2000

Related U.S. Application Data (62) Division of application No. 09/166,929, filed on Oct. 6, 1998, now Pat. No. 6,077,080.

(51) Int. Cl.⁷ .................................................. G09B 1/00
(52) U.S. Cl. ........................ 434/170; 434/159; 434/167
(58) Field of Search ................................. 434/170, 159, 434/156, 167, 169

(56) References Cited

U.S. PATENT DOCUMENTS

| | | | | |
|---|---|---|---|---|
| 3,715,812 A | * | 2/1973 | Novak | 434/170 |
| 4,007,548 A | * | 2/1977 | Cytanovich | 434/178 |
| 4,030,211 A | * | 6/1977 | McGinley | 434/167 |
| 4,457,719 A | * | 7/1984 | Dittakavi et al. | 434/159 |
| 5,429,513 A | * | 7/1995 | Diaz-Plaza | 273/302 |
| 5,478,240 A | * | 12/1995 | Cogliano | 434/327 |
| 5,511,980 A | * | 4/1996 | Wood | 434/169 |
| 5,766,015 A | * | 6/1998 | Shpiro | 434/156 |
| 5,810,598 A | * | 9/1998 | Wakamoto | 434/156 |
| 5,864,844 A | * | 1/1999 | James et al. | 707/4 |
| 6,022,222 A | * | 2/2000 | Guinan | 434/169 |
| 6,491,524 B2 | * | 12/2002 | Bender | 434/159 |

* cited by examiner

Primary Examiner—Derris H. Banks
Assistant Examiner—Bena B. Miller
(74) Attorney, Agent, or Firm—Rader, Fishman & Grauer PLLC (57) ABSTRACT

An education method for aiding to teach and learn proper English reading, sounding and spelling. The method is designed in being able to teach and to learn reading with the proper sounding of the English alphabet rapidly with minimal instruction and supervision. It employs colors and symbols to represent 18 vowel sounds, 30 consonant, phonogram sounds and silent sounds. Each colored alphabet letter with or without symbol maps a designated sound which helps to depict a correct sounding from various spelled combinations of the English language. This color and symbol mapping method facilitates teaching reading of the English words as well as to spell correctly. It reduces long intensive phonic drills as well as guessing mistakes from a various possible sounding.

17 Claims, 8 Drawing Sheets

Root color vowels and their relative sounding chart.

FIG. 1
Root color vowels and their relative sounding chart.

a apple ápe cár hàir e egg bée

I insect ívy pìer o dot ócean twò fòrk u umbrella cúbe bùll pùrple

FIG. 2

Root consonants and relative sounding chart.

| ROOT BLACK sound | RELATIVE BREVE ˘ sound | MACRON ‾ sound | DIERESIS ¨ ch | CIRCUMFLEX ^ sh | BAR/DOT ˉ• zh |
|---|---|---|---|---|---|
| cat<br>k | cĭty<br>s | | ce̤llo | oĉean | |
| dog<br>d | sold̆ier<br>j | face͞d<br>t | | | |
| flag<br>f | of̆<br>v | | | | |
| goat<br>g | gĭraffe<br>j | G͞ila monster<br>h | | | gara˙ge<br>ˉ• |
| jam<br>j | La Jŏlla<br>h | halleluj͞ah<br>y | | | |
| queen<br>qu | uniq̆ue<br>k | | | | |
| sun<br>s | rŏse<br>z | | | ŝugar | viṡion<br>ˉ• |
| tent<br>t | | | picẗure | carnat̂ion | |
| nun<br>n | ĭnk<br>ng | | | | |
| ox<br>ks | x̆ylophone<br>z | | | | |
| zebra<br>z | waltz̆<br>s | | | | aże˙ure<br>ˉ• |

FIG. 3

Root phonograms and relative sounding chart.

| ROOT BLACK PHONOGRAMS sound | RELATIVE | | | |
|---|---|---|---|---|
| | BREVE ˘ sound | MACRON ‾ sound | DIERESIS ·· ch | CIRCUMFLEX ˆ sh |
| church ch | school ˘ k | choir ‾ q | | chandelier ˆ |
| ghost g | laugh ˘ f | | | |
| photo f | Stephen ˘ v | | | |
| thumb th | this ˘ dh | | | |

FIG. 4

Vowels with consonant sounds.

| VOWELS | SOUND | WORDS | |
|---|---|---|---|
| u  o | w | guava | one |
| i  u | y | onion | mural |

FIG. 5

Soft vowel sound, schwa, in light pink colored letters.

above item bottom circus able purple rhythm schism

FIG. 6

Silent and redundant letters in light gray toned letters.

ape cube knit thigh little

FIG. 7

Marking of " ' " apostrophe for syllable division.

ap'ple wom'en al'phabet' chan'delier' hal'lelu²'jah

FIG. 8
Overall mapping of Alphabet Image Reading and AIR Markers.

AIR Markers

| GRAY letters | | SILENT SOUND | k<br>a gray dot below | |
|---|---|---|---|---|
| BLACK CONSONANT letters | COLOR VOWEL letters | ROOT SOUND | Black CONSONANT letters | Color VOWEL |
| c̬ d c̤ c̽ g̲ | 1 a 2 o 3 u | RELATIVE SOUND | c̬ d c̤ c̽ g̲ | 1 a 2 o 3 u |
| PINK letters | | SCHWA SOUND | a pink dot above<br>å | |

FIG. 9

Application of AIR system to the Phonics educational curriculum.

$$\overset{1}{\text{aid}} \qquad \overset{1}{\underset{\circ}{\text{aid}}}$$

$$\overset{1}{\text{maid}} \qquad \overset{1}{\underset{\circ}{\text{maid}}}$$

$$\overset{1}{\text{paid}} \qquad \overset{1}{\underset{\circ}{\text{paid}}}$$

$$\overset{0}{\text{said}} \qquad \overset{0}{\underset{\circ}{\text{said}}}$$

FIG. 10

Application of AIR system to the Whole Language educational curriculum.

Sig the pig is ver$\overset{1}{\text{y}}$ big.

$\overset{0}{\text{S}}$ig the pig is very big.

Mary had a little lamb

FIG. 11
Application of AIR system to a flash card game.

FIG. 12
Application of AIR system to a flash card spelling game.

FIG. 13

Testing and confirming pronunciation with AIR system.

question
circus  knit  women answer
çircus  knit  women

AIR Marker question
circus  knit  women answer
çircus  knit  women

FIG. 14

Application of AIR system to foreign sounding.

Rai lark  east

ALPHABET IMAGE READING METHOD

This application is a divisional of the above application of application Ser. No. 09/166,929 filed Oct. 6, 1998, now U.S. Pat. No. 6,077,080.

BACKGROUND OF THE INVENTION

Reading English is difficult for children and for all the English as second language students because of the complication of the language due to the many languages from which it has borrowed. Unlike other European languages, the English language is not always written as it sounds. Like the International Phonetic Alphabet or pronunciation symbols utilized in dictionaries, the invention is designed in a similar method to assist students to identify the proper sounding but without altering the spelling of the word.

Throughout years of research, the inventor found a number of obscurities and confusion with the current teaching and learning English reading curriculum and concluded that there is an inevitable necessity of visual presentation of the English sounding without distorting the spelling or learning the complicated symbols. In the present invention, the Alphabet Image Reading to aid the proper English sounding and spelling with the following attributes:

1) It employs a simple method to lead children to identify the proper sounding of the word.
2) It does not distort the spelling nor create confusion from memorization of different symbols and rules.
3) It is like the International Phonetic Alphabet and dictionary pronunciation symbols, a complete sounding aid system and flexible to expand when new words and soundings are added.
4) It is compatible to the existing Phonics, whole Language and other English teaching reading curriculums.
5) It can conduct pronunciation tests to any number of students at one time.
6) The method is applicable in teaching sounding of other foreign languages.

SUMMARY OF THE INVENTION

This invention relates to an education method for aiding to teach and learn proper English reading, sounding and spelling wherein colors of alphabet represent each family color and root sound of vowels or consonants and symbols above or underneath depict an altering relative sound branching from those root family sounds. The schwa sound which is a soft vowel, is distinguished by using less intensive color to illustrate a softer sound. Similarly the silent and redundant letters are subdued in lighter gray tone.

It is therefore an object of the present invention to provide an education method for aiding to teach and learn proper English reading, sounding and spelling wherein students can visualize, at a glance, which letters are to be sounded with what sound and which are to be silent.

It is another object of the present invention to provide an education method for aiding to teach and learn proper English reading, sounding and spelling wherein it helps to learn the proper spelling of words through total alphabet combination of sounding and silent letters. It does not deploy many complicated symbols or placing alphabets nearby to confuse students. Thus the proper sounding and spelling is imprinted clearly in the students' mind without the process of difficult memorization of symbols, rules or intensive phonic drills.

It is still another object of the present invention to provide a method of Alphabet image reading which is applicable on any visual media that can be displayed, projected or printed onto. It can be added on to the existing phonics and reading texts by adding the colored symbol markers base on this method. Digital text can be altered into this method through the application of Alphabet Image Reading, hereafter referred to as AIR, software program.

DETAILED DESCRIPTION OF THE EMBODIMENTS

According to the present invention, Alphabet letters are divided into two main classes. The light colorless gray letters are the silent sounds and the colored letters are the root, relative and soft sounds. The root sounds are represented as the standard alphabet sounding. Most of the root sounds have one or more altering sounds branching out from the root family sound. The root sounds are divided into the vowel sounds with vivid colored letters and consonant sounds with black letters.

Figure 1:
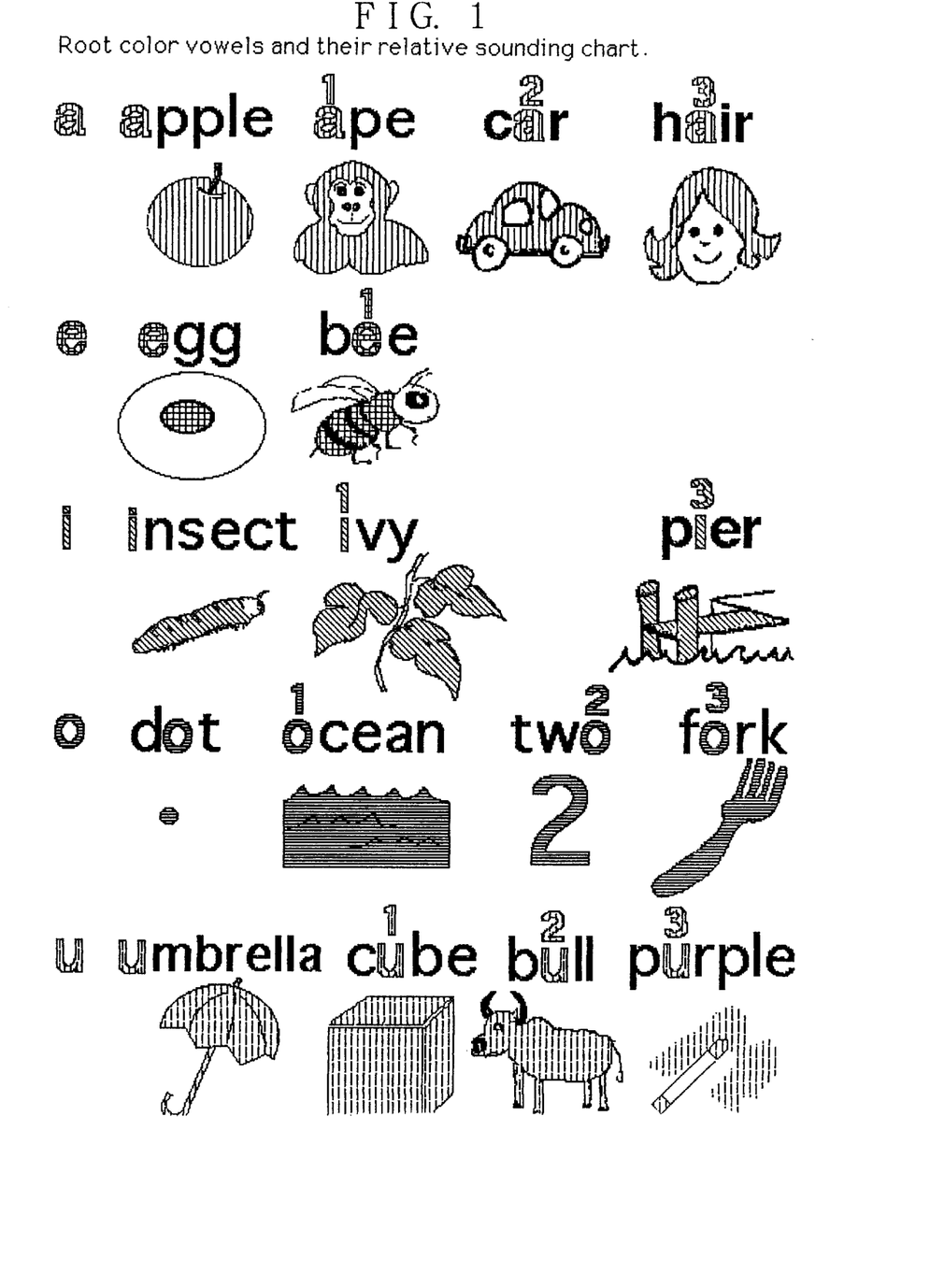
FIG. 1 is a chart illustrating the root color vowels and their relative sounding chart differentiated by the colors and symbols to link its image and the distinct vowel sounding.

FIG. 1 shows the root color vowels and their relative sounding chart differentiated by the colors and symbols to specify its image and the distinct key vowel sounding. Vowels are "a,e,i,o,u" letters. Red, yellow, green, blue and purple are used for "a,e,i,o,u" vowels respectively to represent each root color sounding. Apart from the root color vowels each family has one or more relative sounds differentiated with family colored symbols above each letter. For the vowels these family colors and the symbols designate the sounding of a distinct vowel rather than the written alphabet.

The root color red denotes the short sound of "a" vowel and shows the key word and its image of "apple". The image helps to imprint the color red, the key word and the distinct short sound of "a". The red colored letter has a similar vowel sound as "apple" such in BAT, CAT, ANT, etc. The first relative sound of the family color red with a symbol "1" above the letter is a long "a" vowel. It is represented by "ape" as the key word image. The red ape and the red "1" images aid the linking to the key sounding of a long "a" such in ATE, EIGHT, PREY, etc. The second relative sound in red color with a "2" above the letter represented by "car" as the key word and image. The red colored letter with a red "2" above has a similar vowel sound as "car" such in ARM, FATHER, MARK, etc. The third relative sound in red color with a symbol "3" above the letter represented by "hair" as the key Word and image. The red colored letter with a red "3" above has a similar vowel sound as "hair" such in PEAR, THERE, HARE, etc.

The root color yellow denotes the short sound of "e" vowel and illustrates the key word and its image of "egg". The image helps to imprint the color yellow, the key word and the distinct short sound of "e". The yellow colored letter has a similar vowel sound as "egg" such in PET, SAYS, SAID, etc. The first relative sound of the family color yellow with a symbol "1" above the letter is a long "e" vowel. It is represented by "bee" as the key word and image. The yellow bee and the yellow "1" images aid the linking to the key sounding of a long "e" such in HE, EAT KEY etc.

The root color green denotes the short sound of "i" vowel and illustrates the key word and its image of "insect". The image helps to imprint the color green, the key word and the distinct short sound of "i". The green colored letter has a similar vowel sound as "insect" such in SIT, BEEN, WOMEN, etc. The first relative sound of the family color green with a symbol "1" above the letter is a long "i" vowel. It is represented by "ivy" as the key word and image. The green ivy and the green "1" images aid the linking to the key sounding of a long "i" such in PIE, EYE, SKY, etc. The third relative sound in green color with a symbol "3" above the letter represented by "pier" as the key word and image. The green colored letter with a green "3" above has a similar vowel sound as "pier" such in DEER, YEAR, HERE, etc.

The root color blue denotes the short sound of "o" vowel and illustrates the key word and its image of "dot". The image helps to imprint the color blue, the key word and the distinct short sound of "o". The blue colored letter has a similar vowel sound as "dot" such in COT, MOM, SOX, etc. The first relative sound of the family color blue with a symbol "1" above the letter is a long "o" vowel. It is represented by "ocean" as the key word and image. The blue ocean and the blue "1" images aid the linking to the key sounding of a long "o" such in NOTE, TOE, SEW, etc. The second relative sound in blue color with a symbol "2" above the letter represented by "two" as the key word and image. The blue colored letter with a blue "2" above has a similar vowel sound as "two" such in ZOO, SOUP, BLUE, etc. The third relative sound in blue color with a symbol "3" above the letter represented by "fork" as the key word and image. The blue colored letter with a blue "3" above has a similar vowel sound as "fork" such in OAR, FOR, ALL, etc.

The root color purple denotes the short sound of "u" vowel and illustrates the key word and its image of "umbrella". The image helps to imprint the color purple, the key word and the distinct short sound of "u". The purple colored letter has a similar vowel sound as "umbrella" such in BUS, SON, BLOOD, etc. The first relative sound of the family color purple with a symbol "1" above the letter is a long "u" vowel. It is represented by "cube" as the key word and image. The purple cube and the purple "1" images aid the linking to the key sounding of a long "u" such in BEAUTY, FEW, VIEW, etc. The second relative sound in purple color with a symbol "2" above the letter represented by "bull" as the key word and image. The purple colored letter with a purple "2" above has a similar vowel sound as "bull" such in BUSH, TOOK, WOLF, etc. The third relative sound in purple color with a symbol "3" above the letter represented by "purple" as the key word and image. The purple colored letter with a purple "3" above has a similar vowel sound as "purple" such in FUR, FIR, WORD, etc. Thus root color and their relative sounds are designed to be easily learned and remembered by associating them with their color, images and key sounds.

Figure 2:
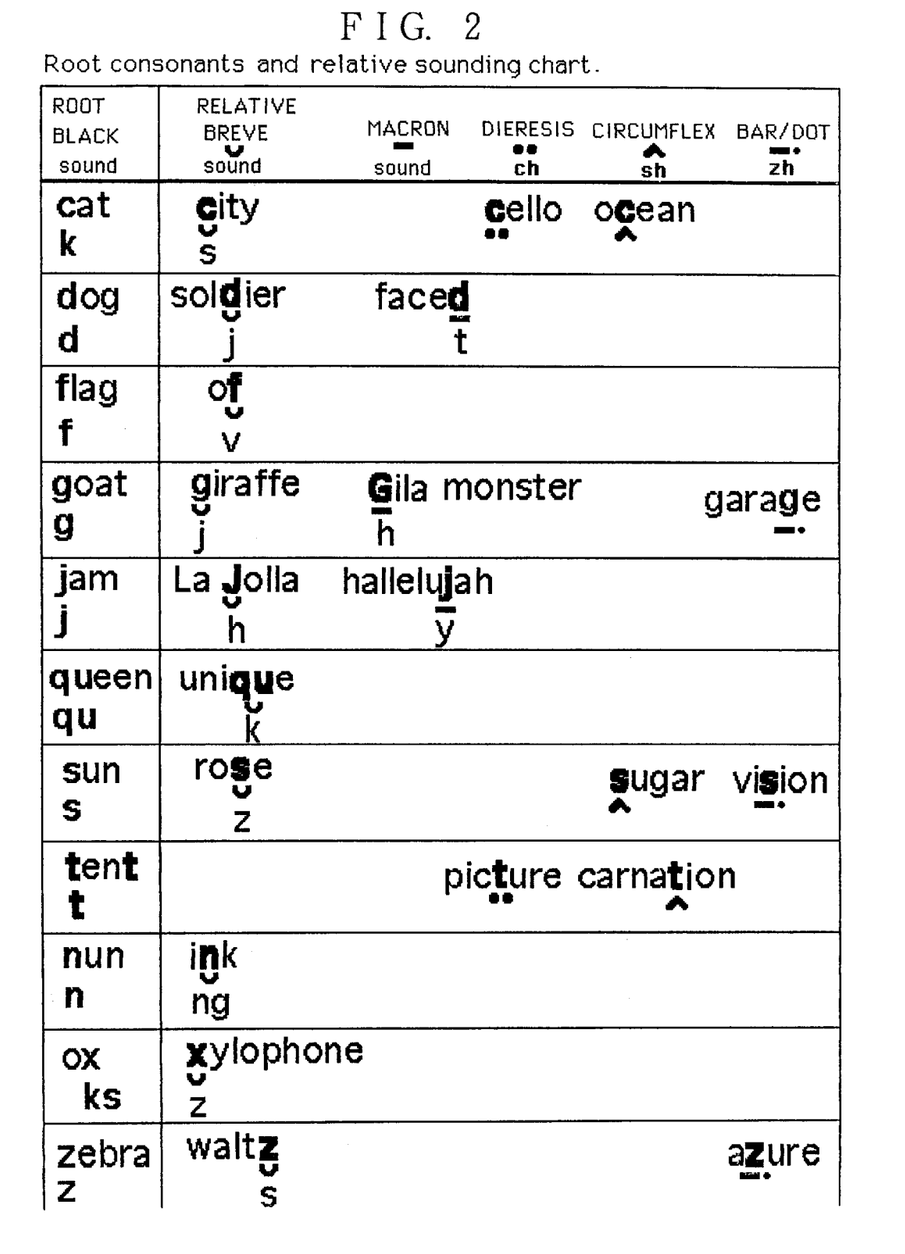
FIG. 2 is a chart illustrating the root consonants and their relative sounding chart, wherein black letters represent the root consonant letter sound and the black letters with symbols underneath represent their relative sounds.

FIG. 2 shows the root consonants and their relative sounding chart. Consonants are all alphabet letters other than the five vowels. The black colored letters represent the fixed sounds of written consonants. The black symbols underneath the letters denote relative consonant sounds different from the written consonants. The FIG. 2 shows only the root consonants that have relative sounds.

The black color c is the root consonant letter sounding of "k" represented by cat as the key image sound. A black breve (curved mark) underneath the "c" denotes the relative sounding of "s" represented by "city" as the key image sound. A black diaeresis (2 dot) underneath the "c" denotes the relative sounding of "ch" represented by "cello" as the key image sound. A black circumflex (inverted v) underneath the "c" denotes the relative sounding of sh represented by "ocean" as the key image sound.

The black color "d" is the root consonant letter sounding of "d" represented by "dog" as the key image sound. A black breve underneath the "d" denotes the relative sounding of "j" represented by "soldier" as the key image sound. A black macron (a bar) underneath denotes the relative sounding of "t" represented by "faced" as the key image sound.

The black color "f" is the root consonant letter sounding of "f" represented by "flag" as the key image sound. A black breve underneath the "f" denotes the relative sounding of "v" represented by "of" as the key image sound.

The black color "g" is the root consonant letter sounding of "g" represented by "goat" as the key image sound. A black breve underneath the "g" denotes the relative sounding of "j" represented by "giraffe" as the key image sound. A black macron underneath the "g" denotes the relative sounding of h represented by "Gila monster" as the key image sound. A black bar/dot symbol underneath the "g" denotes the relative sounding of "zh" represented by "garage" as the key image sound.

The black color "j" is the root consonant letter sounding of, "j" represented by "jam" as the key image sound. A black breve underneath the "j" denotes the relative sounding of "h" represented by "La Jolla" as the key image sound. A black macron underneath the "j" denotes the relative sounding of "y" represented by "hallelujah" as the key image sound.

The black color "qu" is the root consonant letter sounding of "qu" represented by "queen" as the key image sound. A black breve underneath the "qu" denotes the relative sounding of "k" represented by "unique" as the key image sound.

The black color "s" is the root consonant letter sounding of "s" represented by "sun" as the key image sound. A black breve underneath the "s" denotes the relative sounding of "z" represented by "rose" as the key image sound. A black circumflex underneath the "s" denotes the relative sounding of "sh" represented by "sugar" as the key image sound. A black bar/dot symbol underneath the "s" denotes the relative sounding of "zh" represented by "vision" as the key image sound.

The black color "t" is the root consonant letter sounding of "t" represented by "tent" as the key image sound. A black diaeresis underneath the "t" denotes the relative sounding of "ch" represented by "picture" as the key image sound. A black circumflex underneath the "t" denotes the relative sounding of "sh" represented by "carnation" as the key image sound.

The black color "n" is the root consonant letter sounding of "n" represented by "nun" as the key image sound. A black breve underneath the "n" denotes the relative sounding of "ng" represented by "ink" as the key image sound.

The black color "x" is the root consonant letter sounding of "ks" represented by "ox" as the key image sound. A black breve underneath the "x" denotes the relative sounding of "z" representing "xylophone" as the key image sound.

The black color "z" is the root consonant letter sounding of "z" represented by "zebra" as the key image sound. A black breve underneath the "z" denotes the relative sounding of "s" represented by "waltz" as the key image sound. A black bar/dot symbol underneath the "Z" denotes the relative sounding of "zh" represented by "azure" as the key image sound.

Figure 3:
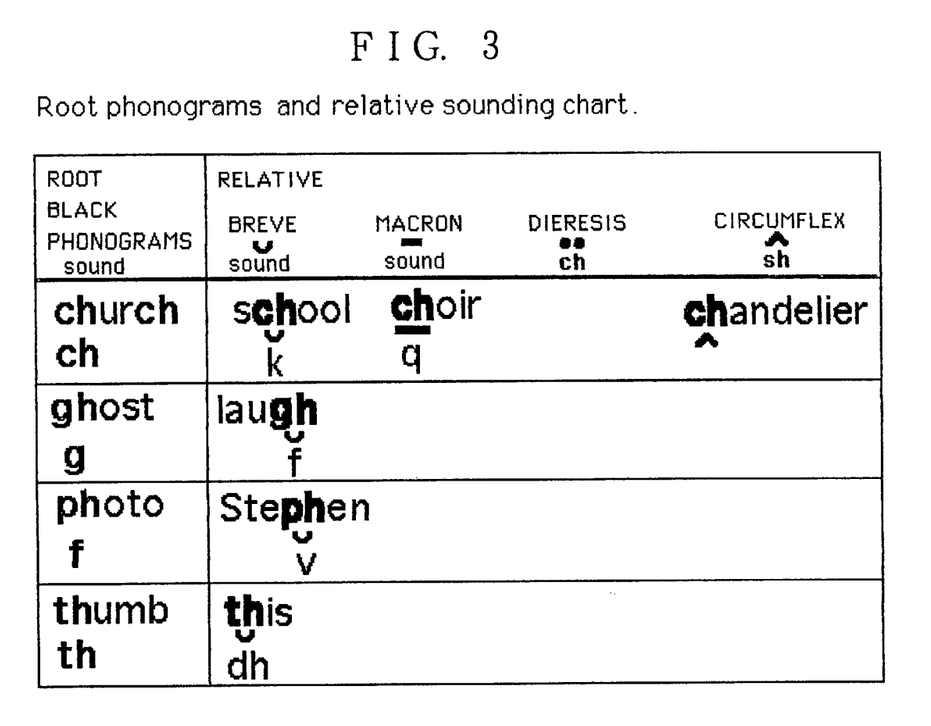
FIG. 3 is a chart illustrating the root phonograms and their relative sounding chart, wherein black letters represent the root phonogram sound and the black letters wish symbols underneath represent their relative sounds.

FIG. "3" shows the root phonograms and their relative sounding chart. A phonogram here is a fixed combination of letters, which is the symbol for one sound in a given word. Black letters represent the root phonogram sound and the black letters with symbols underneath represent their relative sounds.

The black color "ch" is the root phonogram sounding of "ch" represented by "church" as the key image sound. A black breve underneath the "ch" denotes the relative sounding of "k" represented by "school" as the key image sound. A black macron underneath the "ch" denotes the relative sounding of "q" represented by "choir" as the key image sound. A black circumflex underneath the "ch" denotes the relative sounding of "sh" represented by "chandelier" as the key image sound.

The black color "gh" is the root phonogram sounding of "g" represented by "ghost" as the key image sound. A black breve underneath the "gh" denotes the relative sounding of "f" represented by "laugh" as the key image sound.

The black color "ph" is the root phonogram sounding of "f" represented by "photo" as the key image sound. A black breve underneath the "ph" denotes the relative sounding of "v" represented by "Stephen" as the key image sound.

The black color "th" is the root phonogram sounding of "th" represented by "thumb" as the key image sound. A black breve underneath the "th" denotes the relative sounding of "dh" represented by "this" as the key image sound.

Other than the breve and macron, all other symbols underneath a consonant letter or phonogram signify a definite sounding. A diaeresis represents "ch" sound. A circumflex represents "sh" sound. A bar/dot symbol represents "zh" sound.

Figure 4:
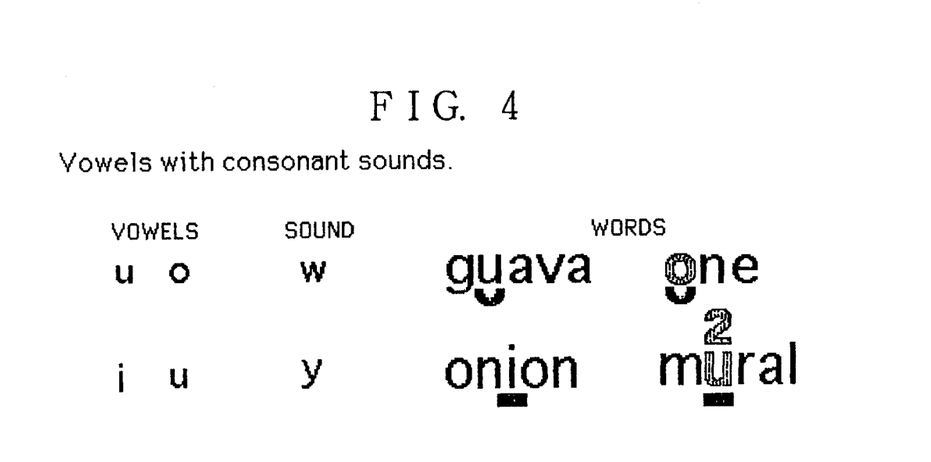
FIG. 4 is a chart illustrating the vowels with consonant sounds.

FIG. 4 shows vowels with consonant sounds. The vowel "u" when with a black breve underneath represents a consonant sound of "w" represented by "guava" as the key image sound. The vowel "o" when with a black breve underneath represents a consonant sound of "w" represented by "one" as the key image sound. In this case "o " will be in purple color to sound the root purple "u" vowel after the consonant sounding of "w". The vowel "i" when with a black macron underneath represents a consonant sound of "y" represented by "onion" as the key image sound.

The vowel "u" when with a black macron underneath represents a consonant sound of "y" represented by "mural" as the key image sound. In this case "u" will be in purple color with "2" above to sound the "bull" vowel after the consonant sounding of "y".

Figure 5:
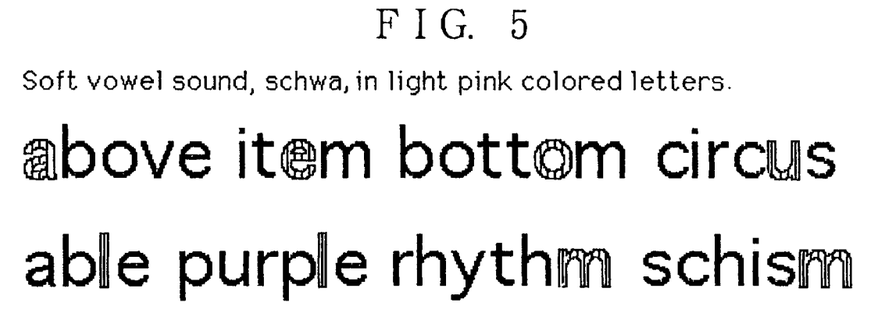
FIG. 5 is a chart illustrating the soft vowel sound, schwa, in light pink colored letters.

FIG. 5 shows the soft vowel sound, schwa, in light pink colored letters. A schwa or unstressed neutral vowel is a soft sounding vowel represented by a light pink color to differentiate from the stronger sounded vowels. Schwa sound has a similar sound no matter which vowel letters they represent. such as "a" in "above"; "e" in "item"; second "o" in "bottom" and "u" in "circus". Some words have a schwa sound between the two consonants. Such as between "bl" in "able"; "pl" in "purple"; "hm" in "rhythm"; "sm" in "schism". When the second consonant is in pink letter, this symbolizes that a schwa sound is sounded between the two consonants.

Figure 6:
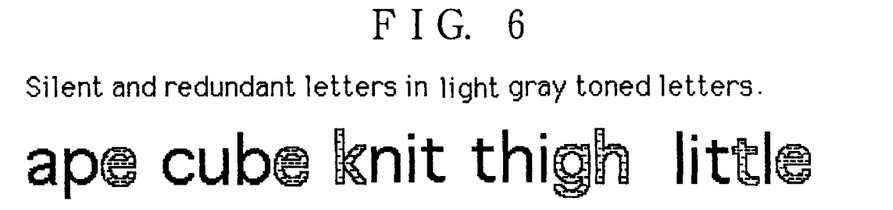
FIG. 6 is a chart illustrating the silent and redundant letters in light gray toned letters.

FIG. 6 shows the silent and redundant letters in light gray toned letters. All silent and redundant letters are in light gray toned letters; such as "e" in "ape", "e" in "cube"; "k" in "knit" and "gh" in "thigh". The second "t" in "little" is a redundant letter and the last "e" is a silent letter. These lighter toned letters are designed to stress other major sounding in vivid colors.

Figure 7:
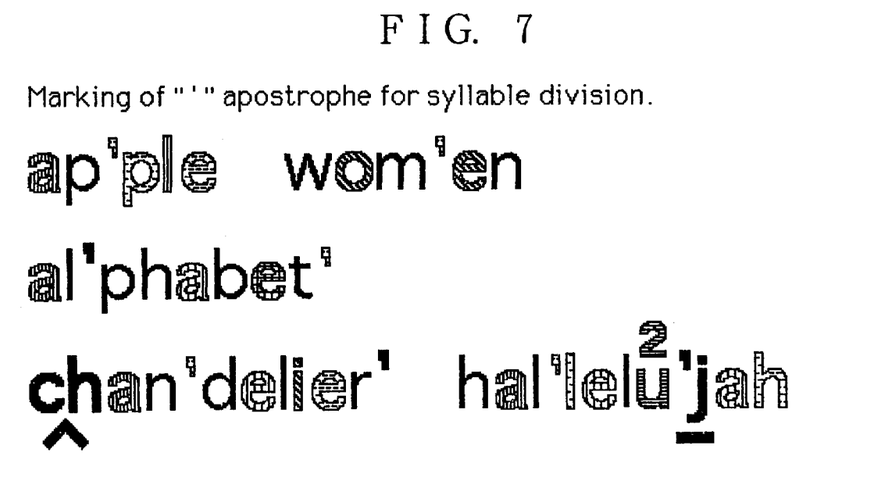
FIG. 7 is a chart illustrating the marking of "'" apostrophe for syllable division.

FIG. 7 shows the marking of """ apostrophe to stress syllables. The gray colored apostrophe represents the stressed syllables. The black bold apostrophe represents the most emphasized syllable. Here the words are shown in Alphabet Image Reading system as well.

Figure 8:
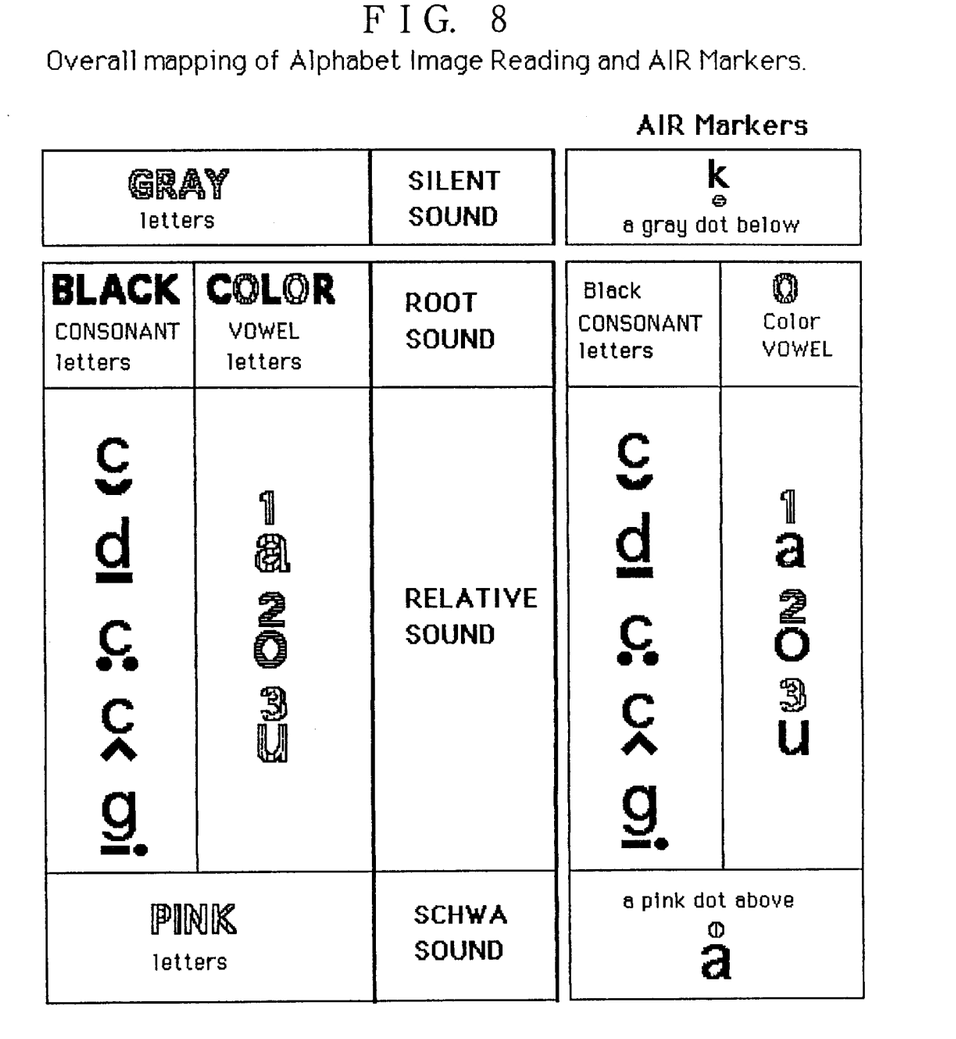
FIG. 8 is a chart illustrating the overall mapping of AIR system, wherein grouping of alphabet sounding representing the two factors of "color and symbol" and the right column explains AIR Markers application represented by the colored symbols only.

FIG. 8 shows sound grouping designed with the two factors of color and symbol to map the students' mind with overall categorization of sounds and to link to a specific image sound. The first overall mapping categorizes colorless gray letters as silent sounds and colored letters as sounding of root, relative and schwa sounds. The second major category is the root consonant sounds in black letters and the root vowel sounds in five colored letters. The last category is the root sounds and their relative sounds differentiated by the symbols but maintaining the family color. The light pink letters are the softest vowel sound of schwa.

On the right hand column of FIG. 8, AIR system is applied only with color markers. A gray dot symbol underneath designates the silent sounds. The colored symbol "0" markers are added above the letter to represent the proper root vowel sounds. The relative sounds are with colored markers placed above the vowels and black markers underneath the consonants. A pink dot above is added to represent the schwa sounds.

No matter which alphabet letter the word shows, the letter sound is lead by the color to its root and symbol to its relative key image sound. This simple overall mapping and image linking helps the students to memorize the sounding chart easier without deploying many complicated symbols or altering the original spelling.

Figure 9:
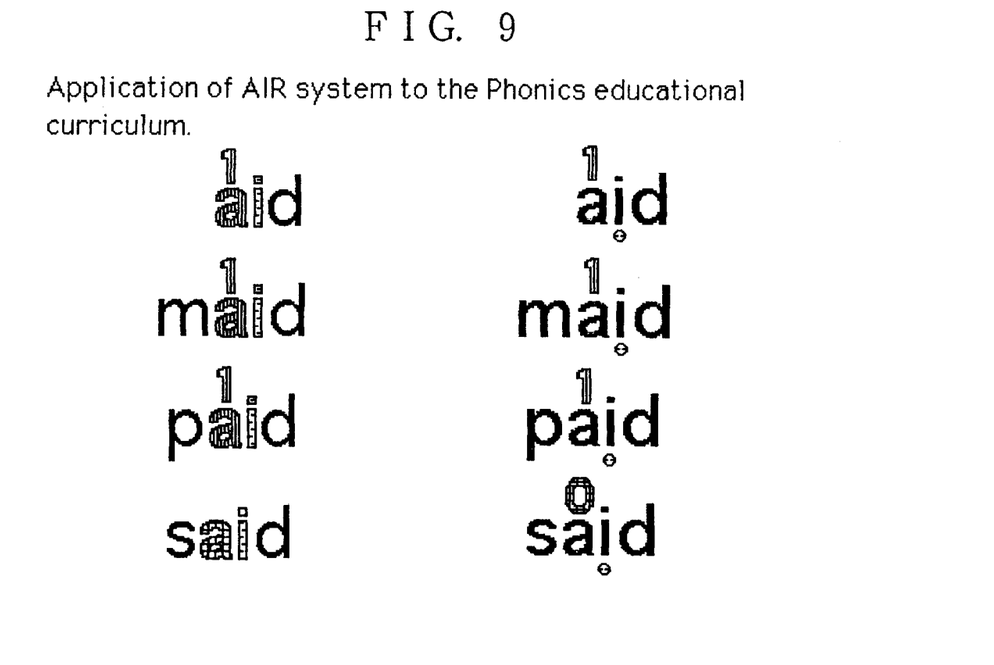
FIG. 9 is a chart illustrating the application of AIR system to the phonics educational curriculum.

FIG. 9 shows AIR system applied to a "Phonics" system. The phonics pronunciation method is said to help the students learn strategies for decoding words. AIR system applied to phonics teaching method visually clarify which to sound and with what sound. Here the color and symbol identify the differences of sounding of words with similar ending. Thus AIR system helps students visually understand the strategies for decoding words. On the right chart, AIR markers are applied to the existing educational phonics. Teachers can use these AIR markers to existing phonic charts without dissipating current curriculums.

Figure 10:
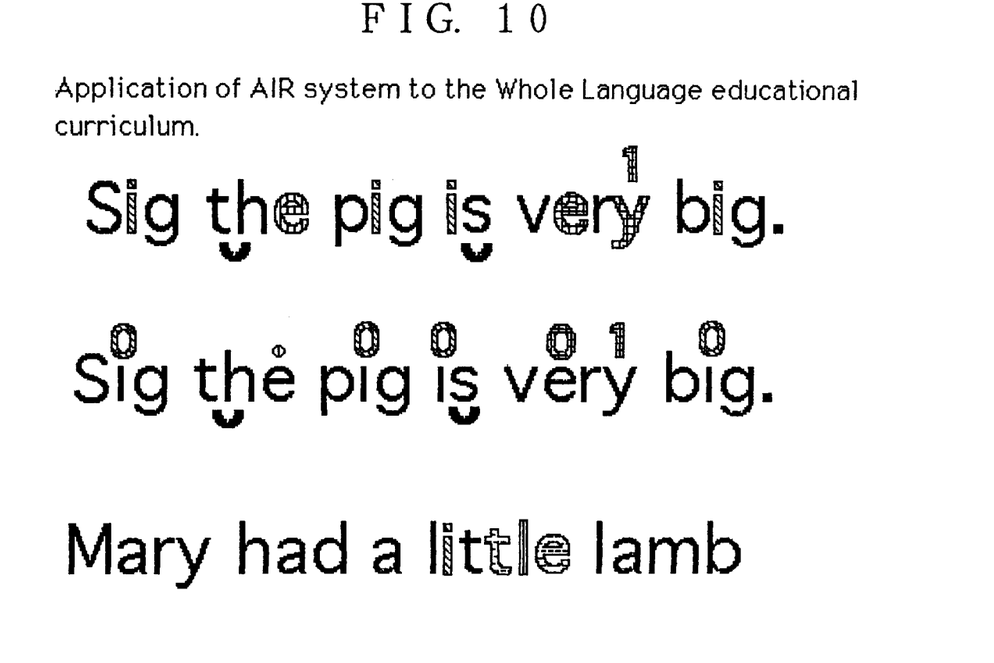
FIG. 10 is a chart illustrating the application of AIR system to the whole Language educational curriculum.

FIG. 10 shows AIR system applied to a reading text such from the "Whole Language system". The whole language system is said to encourage the students to challenge reading new words from a reading text. The disadvantage with this system is that the teachers are not able to assist to decode all words within the text. AIR system applied to a reading text help the students visually identify the sounding and learn to read each words by themselves. The AIR system encourages the young students to read and enjoy literature. It helps to learn new words as well as overall understanding of the context. AIR markers are applied to an-existing reading text for the second line.

The text with AIR system could be scripted in the film or video medium to help visually follow, read and identify the word as it is narrated.or sang through the movie. The last line visually depict the sounding of the colored word "little" as it is being sang or narrated in the film or video script.

Figure 11:
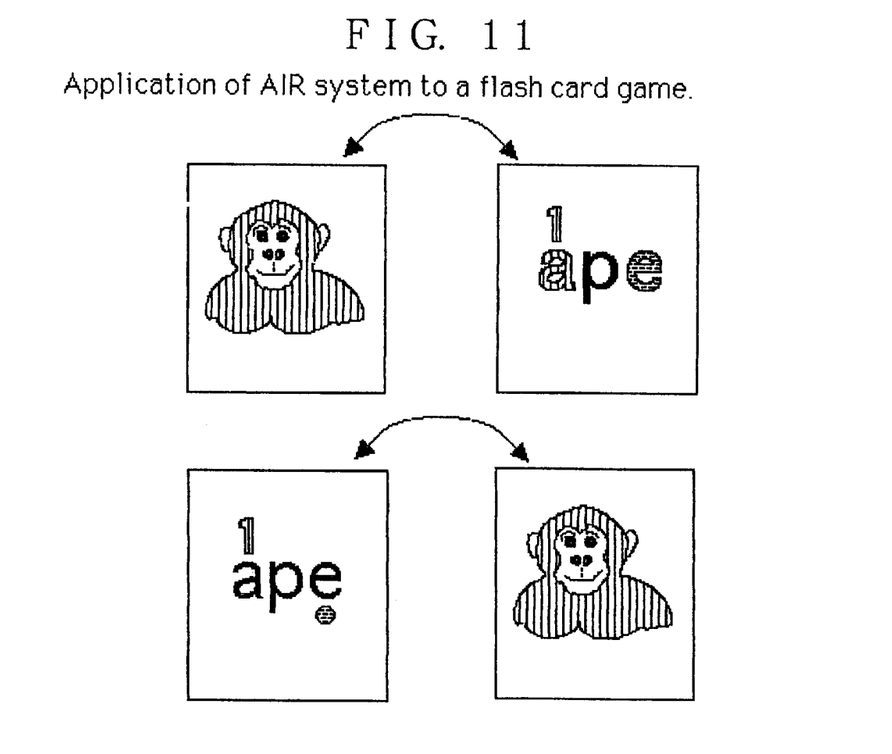
FIG. 11 is a chart illustrating the application of AIR system to a flash card game.

FIG. 11 shows the use of AIR system as a teaching and reading tool in a game application such as flash cards. The students challenge to sound the name of a picture which is written on the reverse side of the card. With two sets of the same card, the students can pick a word and find the matching picture. On the bottom row, AIR markers are shown to the existing flash card.

Figure 12:
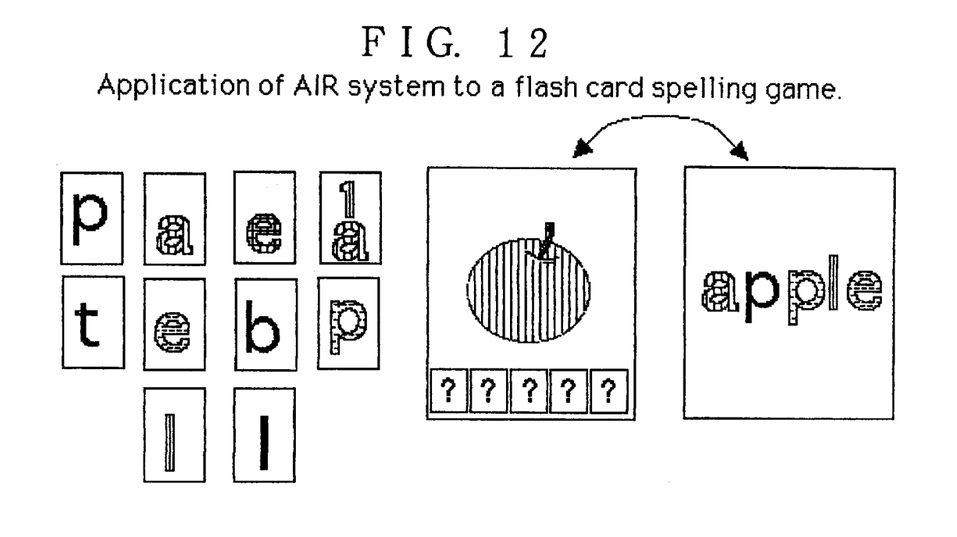
FIG. 12 is a chart illustrating the application of AIR system to a flash card spelling game.

FIG. 12 shows the similar flash card game as above with a challenge to spell properly. In addition to above flash cards, another set of cards of 48 sounding letters in AIR system are chosen to build the word with proper spelling and sounding. The students can confirm the correct answer by reversing the flash card. In this manner AIR system can be applied to teach and learn the English language through number of game oriented educational tools.

Figure 13:
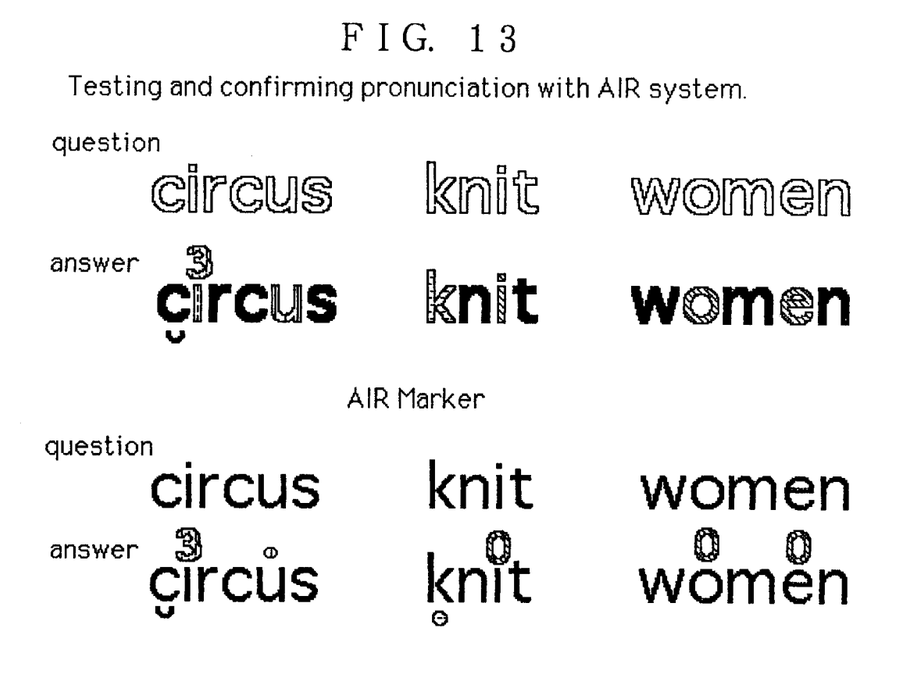
FIG. 13 is a chart illustrating testing and confirming pronunciation with AIR system.

FIG. 13 shows a reading test. Testing and confirming pronunciation are conducted by coloring the outlined script and marking with appropriate symbols to each word. The first line is the selection of words in questions and the second line is the answers.

AIR markers are used by (placing the appropriate colored symbols to each word. The third line is the selection of words in questions and the fourth line is the application of AIR marker in answers. The AIR system can be given to test and confirm various number of words to any number of students at one time.

Figure 14:
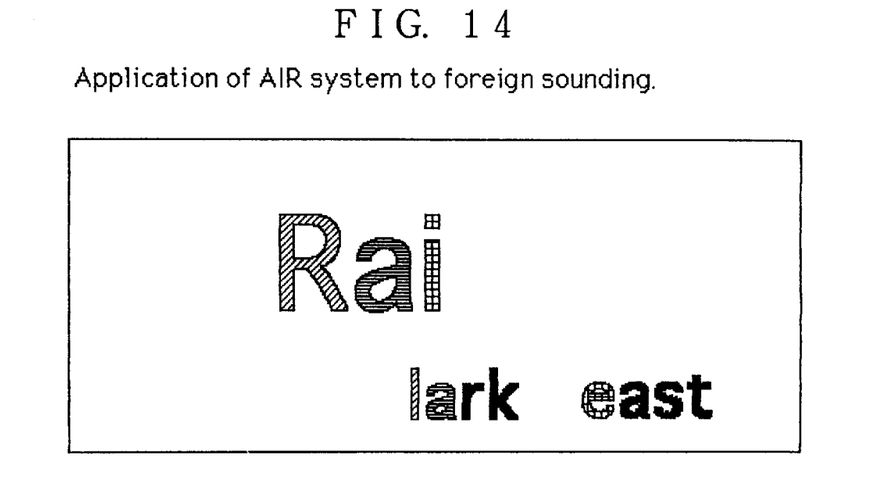
FIG. 14 is a chart illustrating the application of AIR system to foreign sounding.

FIG. 14 shows AIR system application to foreign sounding. The AIR system is flexible enough to add colors and symbols as the new words are added to the English language in the future. The brown color is used to show the consonant "r" of Rai is sounded as "1" and blue "a" as the root sound of "o" as in "lark". The yellow color of "i" represents the long "e" sound as in "east". Here colors and letters are deploy to pronounce "Rai" with a simple pronunciation guide on the bottom. The AIR system is not necessary to deploy such colors and symbols as mentioned in FIGS. 1 to 8, it may use other colors and symbols that are familiar or convenient to link with other images and key sounds. AIR system of mapping and linking specific image sound is also applicable to help teach and learn foreign languages as well as the English language.

The educational curriculum mentioned as above from FIGS. 9 to 13 can be incorporated in the digital multimedia such as the computer and Internet. AIR system can be programed in a digital media and conjugate with a number of other interactive software programs. Such programs as reading, pronunciation check and dictionary software to enhance the learning and practice experiences.

AIR system in digital fonts software can incorporate with existing word processor software to create text in AIR system as shown in FIGS. 9 and 10. There are many different types of fonts added to word processing software programs. The fonts software in AIR system can be plugged into the third party software to produce the text in AIR fonts to assist in read in a foreign words, new words, proper names-or to produce phonics and reading curriculum texts. As shown in FIG. 13, the reading test can be produced and administered similarly with computer with this AIR font software.

The AIR translation software program can rewrite over the digital text into the AIR fonts with proper sounding which the students have selected to read. The selected print text can be manually input or altered to a digital format through scanning into the computer with existing published software and hardware. The students can choose the whole text or select the words that need to be assisted into the AIR fonts with this AIR translation software program. This software encourages the students to expand their reading experiences and interests beyond the school curriculum without the assistance of teachers.

As described above, according to the present invention, there is provided an alphabet image reading method to teach and learn proper English reading, sounding and spelling, by representing the colors and symbols to map overall category and to link to specific image sounding without disrupting the spelling of the word.

In this alphabet image reading method, the colors are employed to categorize the silent sounds with light gray letters and the sounding with colored letters. The sounding letters are divided into the root sounds, relative sounds and a soft sound of schwa. The root sounds are represented as the Standard alphabet sounding. Most of the root sounds have one or more relative sounds differentiated by the symbols but maintaining the family color. The symbols represent altering sounds branching out from the standard root sound. The red, yellow, green, blue and purple letters are the root vowel sounds and the black letters are the root consonant sounds. The light pink letters are the soft sound of schwa. Each letter is lead by the color and symbol to a specific key image sound as follows:

The colored vowels represent the root short vowels of "a" with a red "apple", "e" with a yellow "egg", "i" with a green "insect", "o" with a blue "dot" and "u" with a purple "umbrella" as their colors, images and key sounds. The first relative sound branching out from the root vowels are the long vowel sounds depicted by the symbol "1" above the letters. The red "1" represent the long vowels with a red "ape", a yellow "1" with a yellow "bee", a green "1" with a green "ivy", a blue "1" with a blue "ocean" and a purple "1" with a purple "cube" as their colors, images and key sounds. The second relative sounds depicted with a red symbol "2" above represents a red "car" vowel, a blue "2" above represents a blue "two" vowel and a purple "2" above represents a purple "bull" vowel as their colors, images and key sounds. The third relative sounds depicted with a red symbol "3" above represents a red "hair" vowel, a green "3" above represents a green "pier " vowel, a blue "3" above represents a blue "fork" vowel and a purple "3" above represents a "purple" vowel as their color, image and key sounds.

The black root consonants with relative sounds are the letters "c" with "cat", "d" with "dog", "f" with "flag", "g"

with "goat", "j" with "jam", "qu" with "queen", "s" with "sun", "t" with "tent", "n" with "nun", "x" with "ox" and "z" with "zebra" as their images and key sounds. The first relative sounds depicted with a black breve underneath the letter are with the sounding of "s" with "city", "j" with "soldier", "v" with "of", "j" with "giraffe", "h" with "La Jolla", "k" with "unique", "z" with "rose", "ng" with "ink", "z" with "xylophone" and "s" with "waltz" as their images and key sounds. The second relative sounds depicted with a black macron underneath the letter are with the sounding of "t" with "faced", "h" with "Gila monster", "y" with "hallelujah" as their images and key sounds. The third relative sound depicted with a black diaeresis underneath is the sounding of "ch" with "cello" and "picture" as their images and key sounds. The fourth relative sound depicted with a black circumflex underneath is sounding of "sh" with "ocean", "sugar" and "carnation" as their images and key sounds. The fifth relative sound depicted with a black bar/dot underneath is sounding of "zh" with "garage", "vision" and "azure" as their image and key sounds respectively.

The black consonant phonograms with relative sounds are with the sounding of "ch" with "church", "g" with "ghost", "f" with "photo" and "th" with "thumb". Their first relative sounds depicted with a black breve underneath are sounding of "k" with "school", "f" with "laugh", "v" with "Stephen", "dh" with "this" as their image and key sounds. The second relative sound depicted with a black macron underneath is sounding of "q" with "choir" as its image and key sound. The fourth relative sound depicted with a black circumflex underneath is sounding of "sh" with "chandelier" as its image and key sound.

The vowels with consonant sounds depicted with a black breve underneath is sounding of "w" with "guava", a black macron underneath is sounding of "y" with "onion" as their images and key sounds.

The light pink letters represent the softest vowel sound of schwa sound. When the second consonant is in pink letter, this symbolizes that a schwa sound is sounded between the two consonants. Schwa sound is a similar sounding in "a" with "above", "u" with circus and between "pl" with "purple" which are their image and key sounds.

Further, this alphabet image reading is applicable with AIR markers without altering the colors of the alphabet letters and applicable to the existing educational curriculum. Eight colors of symbol markers placed such that a gray dot symbol underneath the letters designates the silent sounds. The five family colored symbol "0", makers are added above the letters to represent each root vowel sound. The relative sounds are placed with appropriate colored symbol markers above the vowels and appropriate black symbol markers underneath the consonants. A pink dot above the letters represents the schwa sounds.

Still further, this alphabet image reading method is applicable for testing and confirming English pronunciation, wherein the, testing words are presented in outlined fonts, the students answer them by filling appropriate family colors and placing appropriate symbols to the letters. Similar testing can be applicable to conventional printed letter format by placing AIR makers to the letters instead.

Yet further, this alphabet image reading method is applicable to the existing phonics, whole language educational curriculum and English educational games by means of printed media or display in analog or digital format as follows. AIR markers added to the existing educational printed media. The text with AIR method scripted in the film or video medium and present the words in AIR format as it is narrated or sang through the movie. A computer software fonts in AIR method plugged into the existing word processor or educational software programs and produce the educational curriculums in AIR fonts. A computer software to translate automatically the digital text into the AIR method and assist the students identify the sounding and learn to read the text by themselves.

Further, this alphabet image reading method is applicable to map other languages other than the English language. It is not necessary to use the said set of colors to root consonants and vowels, nor said symbols link to said selection of images and key words. According to each cultural differences and understanding of students other color combination and other symbols are applicable to map.and link to their specific images and sounds. It is flexible to add new colors and symbols as new sounds and words develop in the future. The method is to help the student organize the overall sound mapping with colors and symbols to their specific key image sounds.

The invention may be embodied in other forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An alphabet image reading system comprising:
    a medium having a word thereon, said word having a plurality of alphabet characters,
    an alphabet character of said plurality of alphabet characters having an alphabet shape and having an alphabet color, said alphabet color being one of a root color, a soft sound color and a silent sound color,
    said alphabet character being one of a vowel, a different vowel and a consonant, said root color of said vowel being different than said root color of said consonant, said root color of said vowel being different than said root color of said different vowel,
    said alphabet character positioned on said medium within said word representing a sound made during human speech, said sound made during human speech being one of a root sound, a relative sound, a soft sound and a silent sound,
    a reading mark being a symbol that is disposed on said medium above or below said alphabet character,
    said root sound being depicted on said medium within said word by the absence of said reading mark in combination with said alphabet shape and said root color,
    said relative sound being depicted on said medium within said word by the disposition of said reading mark in combination with said alphabet shape and said root color,
    said soft sound being depicted on said medium within said word by said soft sound color, said soft sound color differing from said root color,
    said silent sound being depicted on said medium within said word by said silent sound color, said silent sound color differing from said soft sound color and said root color.

2. A system of claim 1, wherein said root sound differs from said relative sound, said soft sound and said silent sound.

3. A system of claim 1, wherein said relative sound differs from said root sound, said soft sound and said silent sound.

4. A system of claim 1, wherein said soft sound is a schwa sound made during human speech, said soft sound differing from said root sound, said relative sound and said silent sound.

5. A system of claim 1, wherein said silent sound is when no sound is made during human speech, said silent sound differing from said root sound, said relative sound and said soft sound.

6. A system of claim 1, wherein another alphabet character is disposed within said word, said another alphabet character having a color different from said root color.

7. A system of claim 1, wherein another symbol on said medium disposed adjacent said reading mark further depicts said relative sound.

8. A system of claim 1, wherein said alphabet character has a different relative sound, said different relative sound being distinct from said relative sound.

9. A system of claim 1, wherein said alphabet shape is a shape of said alphabet character.

10. A system of claim 1, wherein said alphabet color represents said root sound.

11. A system of claim 1, wherein said alphabet character in combination with said alphabet color and the disposition of said reading mark represents said relative sound.

12. A system of claim 1, wherein said alphabet color is gray when said relative sound or said root sound is a silent sound.

13. A system of claim 1, wherein said alphabet color depicting said root sound is different from another color depicting a schwa sound.

14. A system of claim 1, wherein said medium is a video or film display.

15. A system of claim 1, wherein said medium is vocalized.

16. A system of claim 1, wherein said medium is incorporated within a digital medium.

17. An alphabet image reading system comprising:

a medium having a word thereon, said word having a plurality of alphabet characters, an alphabet character of said plurality of alphabet characters having an alphabet shape and having an alphabet color, said alphabet color being one of a root color, a soft sound color and a silent sound color, said alphabet character being one of a vowel, a different vowel and a consonant, said root color of said vowel being different than said root color of said consonant, said root color of said vowel-being different than said root color of said different vowel, said alphabet character positioned on said medium within said word representing a sound made during human speech, said sound made during human speech being one of a root sound, a relative sound, a soft sound and a silent sound, a reading mark being a symbol that is disposed on said medium above or below said alphabet character, said root sound being depicted on said medium within said word by the absence of said reading mark in combination with said alphabet shape and said root color, said relative sound being depicted on said medium within said word by the disposition of said reading mark in combination with said alphabet shape and said root color.

\* \* \* \* \*